Oct. 17, 1961 G. W. NEWBERY ET AL 3,005,160
COINCIDENT SWITCHING WITH HIGH FREQUENCY COMPONENTS ELIMINATED FROM GATING PULSE
Filed July 7, 1958
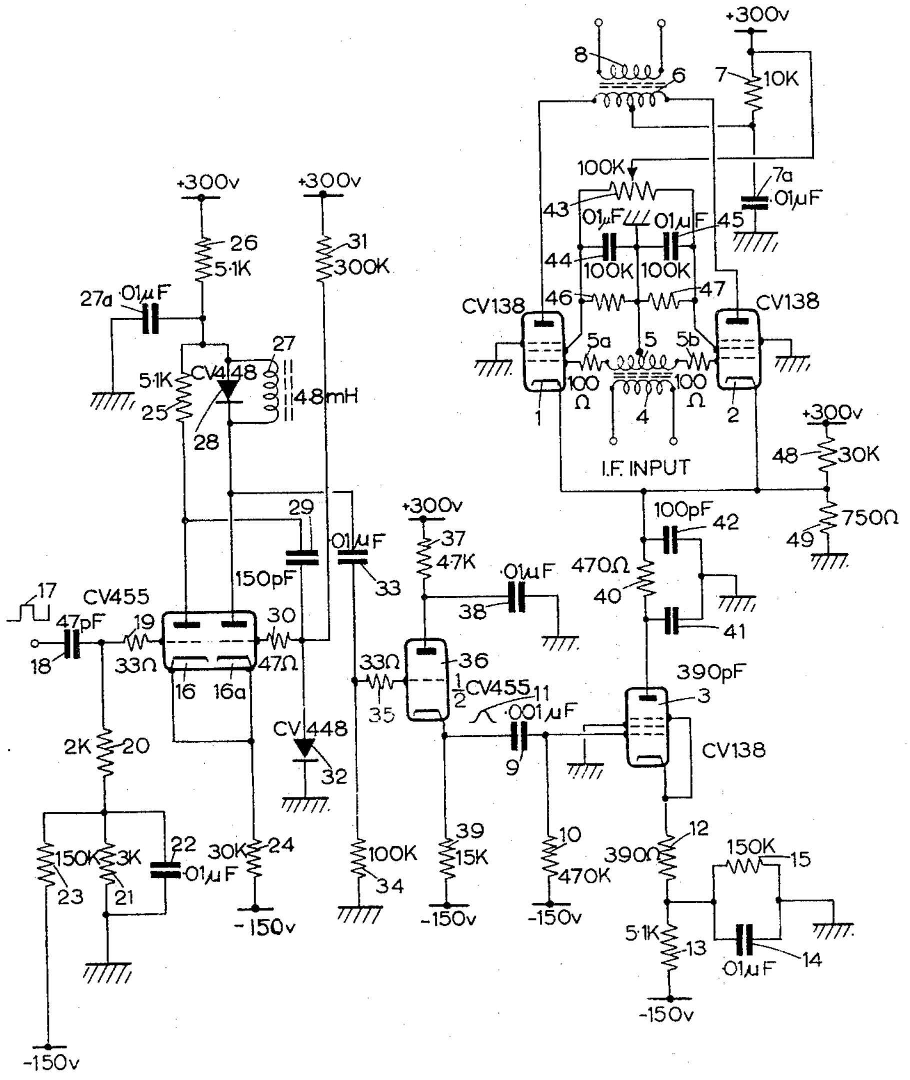
Inventors
G. W. Newbery
P. M. Montgomery
P. F. T. C. Stillwell
By Glascock Downing & Seebold
Attys.

United States Patent Office 3,005,160

Patented Oct. 17, 1961

3,005,160

COINCIDENT SWITCHING WITH HIGH FREQUENCY COMPONENTS ELIMINATED FROM GATING PULSE

Gordon William Newbery, London, Peter Murdo Montgomery, Thames Ditton, and Peter Frederic Thomas Cryer Stillwell, Aylesbury, England, assignors to Electric & Musical Industries Limited, Hayes, Middlesex, England, a company of Great Britain Filed July 7, 1958, Ser. No. 747,082

Claims priority, application Great Britain July 13, 1957

11 Claims. (Cl. 328—91)

This invention relates to electrical gating circuits for gating signals fed thereto from a high frequency channel such as a channel handling radar signals comprising high frequency oscillations of the order of twelve megacycles per second. The invention has particular but not exclusive reference to gating circuits of the kind comprising a pair of valves connected in push-pull having their cathodes connected to a common cathode impedance in the form of a further valve, the signals to be gated being applied to the pair of valves in push-pull whilst gating pulses are applied to the valve forming said cathode impedance.

Usually with gating circuits the gating pulses are of substantially rectangular form and therefore include high frequency components. With a circuit of the kind described it is usually found that adequate discrimination against the appearance of high frequency components of the gating pulses in the output circuit of the pair of valves is afforded. However when the signal level of the signals to be gated is low, for example of the order of 50 microvolts or less and the gating period is short, for example of the order of one microsecond, then there is a tendency for the high frequency components of the gating pulses to appear in the output circuit of said pair of valves and thus become superimposed on the gated signals.

The object of the present invention is to provide an improved gating circuit with a view to reducing the tendency for components of the gating pulses to appear in the output of the gating circuit more especially when the signals to be gated are high frequency low level signals and when the gating period is short.

According to the invention there is provided in a radio receiver in an early stage thereof where the signal level is low, a high frequency channel including an electrical gating circuit for gating low level signals in said channel, means for generating gating pulses, means for deriving from said generating means gating pulses containing substantially only frequency components lower than the frequency components of signals passed by said channel and means for feeding said pulses to said gating circuit.

Such gating pulses are preferably in the form of a half cycle of sinusoidal oscillation and such a form of gating pulse may be derived from a ringing circuit. In order further to reduce the frequency components of the gating pulses a low pass filter may be provided through which the gating pulses are passed. Where the invention is applied to a gating circuit of the kind described such filter may be provided between the output of said valve forming the common cathode impedance of the cathodes of said pair of valves. Further if desired a differential bias can be applied to screening grids of said pair of valves in a gating circuit of the kind described which can be adjusted to afford a minimum residual gating signal in the output circuit of said pair of valves, and furthermore if desired the cathodes of said pair of valves may be connected to a bleed resistance so as to ensure that the impedance of the cathodes of said valves do not vary substantially during the gating periods.

In order that the said invention may be clearly understood it will now be more fully described with reference to the accompanying drawing which illustrates a gating circuit in accordance with the preferred form of the invention which is suitable for gating radar signals at an intermediate frequency of twelve megacycles per second, the gating period being of the order of one microsecond and the level of the intermediate frequency signals being very low, say fifty microvolts or less.

As shown in the drawing the gating circuit comprises a pair of valves 1 and 2 having their cathodes connected to the anode of a valve 3 forming a common cathode impedance for the valves 1 and 2. The signals to be gated are applied to the primary winding of a transformer 4, the secondary winding 5 of which is connected between the control electrodes of the valves 1 and 2 through anti-parasitic resistances *5a* and *5b* and has a centre tapping connected to earth. The anodes of said valves 1 and 2 are connected to a winding 6 of a transformer the centre tap of which is connected to a source of positive potential through a resistance 7 which is decoupled to earth through a condenser *7a*. Gated output signals are derived from a winding 8 coupled to the winding 6. The valves 1, 2 and 3 are pentode valves the suppressor electrodes of valves 1 and 2 being earthed. Gating pulses are applied to the control electrode of the valve 3 through a condenser 9 and leak resistance 10 and when the valve 3 is non-conducting no current will flow in the valves 1 and 2, but when the valve 3 is rendered conducting on the application of gating pulses, current flows in the valves 1 and 2 so as to gate the signals applied to the winding 4. The gating pulses applied to the valve 3 are arranged so that the maximum rate of rise thereof is not substantially different from the maximum rate of rise of a sinusoidal pulse of substantially equal amplitude aud duration. For this purpose the gating pulses applied to the valve 3 are substantially in the form of a half cycle of sinusoidal oscillation as indicated at 11 the duration of said pulses being 1 microsecond to provide the gating period aforesaid. The valve 3 has its screening electrode earthed and its suppressor electrode connected to the cathode of the valve, the cathode circuit of which is connected to a source of negative potential through a pair of series resistances 12 and 13, the resistance 13 being large so as to provide a substantial degree of negative feed-back, but this resistance is by-passed at high frequencies by the provision of a condenser 14 connected to earth shunted by a resistance 15. Where a plurality of gating circuits are employed with as far as possible identical gains it is preferred to employ a large degree of negative feed-back in the cathode of valve 3 and to employ a somewhat larger gating pulse than is strictly necessary so that the circuits are less responsive to valve variations.

The sinusoidal gating pulses 11 are preferably generated from a ringing circuit and in the embodiment of the invention shown this ringing circuit is disposed in the anode circuit of one of a pair of valves 16 and *16a* forming a multivibrator. The multivibrator is triggered by rectangular pulses indicated at 17 having a repetition rate corresponding to the intervals between gating periods which are applied to the control electrode of the valve 16 through a condenser 18 and anti-parasitic resistance 19, the control electrode of the valve 16 being connected to a resistance 20 in series with a further resistance 21 which is connected to earth and shunted by a condenser 22, the junction point of the resistances 20 and 21 being connected through a resistance 23 to a source of negative biasing potential. The cathodes of the valves 16 and 16a are connected together and to a source of negative potential through a resistance 24. The anode of the valve 16 is connected to a resistance 25 which is in turn connected to a source of positive potential through a resistance 26, the junction point of the two resistances 25 and 26 being decoupled to earth through a condenser 27a. The anode of the valve 16a is connected to the resistance 26 and to said source of positive potential through an inductance 27 shunted by a damper valve 28 shown in the form of a diode. The anode of the valve 16 is coupled to the control electrode of the valve 16a through a coupling condenser 29 and anti-parasitic resistance 30. The control electrode of the valve 16a is also connected to a source of positive potential through a resistance 31 and to earth through a diode 32 which is so arranged as to tend to maintain the potential of the control electrode of the valve 16a at earth potential. The valves 16 and 16a are thus connected to form a multivibrator and the arrangement is such that with the valve 16 non-conducting and the valve 16a conducting, a pulse 17 applied to the control electrode of the valve 16 causes this valve to be rendered conducting and the valve 16a non-conducting and when the pulse 17 ceases, the valve 16 is rendered non-conducting and the valve 16a conducting. The inductance 27 constitutes a ringing circuit and when the valve 16a is rendered non-conducting sinusoidal oscillations appear in the inductance 27, but due to the provision of the damper valve 28 these sinusoidal oscillations only persist for a half cycle. This half cycle of oscillation is fed from the anode of the valve 16a through a coupling condenser 33 and leak resistance 34 and anti-parasitic resistance of the control electrode of a valve 36. The anode of the valve 36 is connected through a resistance 37 to a source of positive potential and is decoupled to earth through a condenser 38. The cathode of the valve 36 is provided with a large cathode resistance 39 which is connected to a source of negative potential, the resistance 37 causing the valve to function as a cathode follower so that the positive half cycle of sinusoidal oscillation set up at the anode of the valve 16a is fed without phase reversal to the control electrode of the valve 3 to switch this valve into operation on the occurrence of the gating pulses. The valve 36 is however not essential. It will be appreciated that the sinusoidal gating pulses 11 contain substantially only low frequency components compared with rectangular pulses which contain a wide range of frequencies extending up to many megacycles per second. Hence by employing such sinusoidal pulses a substantial reduction in the appearance of frequency components of gating pulses in the output winding of the valves 1 and 2 is effected so that the possibility of such components becoming superimposed on the twelve megacycle signal to be gated is substantially reduced. In order further to reduce the appearance of frequency components of the gating pulses in the winding 8 a low pass filter can be provided connecting the anode of the valve 3 to the cathodes of the valves 1 and 2. As shown the anode of the valve 3 is connected through a resistance 40 opposite ends of which are connected by condensers 41 and 42 to earth. It is also preferred to apply a differential bias to the screening electrodes of the valves 1 and 2 which enables a control to be obtained so as further to minimise the appearance of frequency components of the gating pulses in the output winding 8. As shown the screening electrodes of the valves 1 and 2 are connected to the ends of a potentiometer 43 the slider of which is connected to the source of anode potential for the valves 1 and 2. The screening grids are decoupled to earth through condensers 44 and 45 and resistances 46 and 47 respectively. As shown the anode potential for the valve 3 is derived from a resistance 48 connected to a source of positive potential and this resistance is also connected to earth through a bleed resistance 49.

The drawing indicates typical values for the components for the purpose of gating the aforesaid radar signals.

Although the invention has been described above as applied to a gating circuit of the kind described it will be appreciated that the invention can be applied to other kinds of gating circuits.

What we claim is:

1. In a radio receiver the provision, in an early stage thereof where the signal level is low, of a high frequency channel including an electrical gating circuit for gating low level signals in said channel, means for generating gating pulses, means for deriving from said generating means gating pulses containing substantially only frequency components lower than the frequency components of signals passed by said channel and means for feeding said pulses to said gating circuit.

2. In a radio receiver the provision, in an early stage thereof where the signal level is low, of a high frequency channel including an electrical gating circuit for gating low level signals in said channel, means for generating gating pulses, means for deriving from said generating means gating pulses each substantially in the form of a half cycle of sinusoidal oscillation and containing substantially only frequency components lower than the frequency components of signals passed by said channel and means for feeding said pulses to said gating circuit.

3. In a radio receiver the provision, in an early stage thereof where the signal level is low, of a high frequency channel including an electrical gating circuit for gating low level signals in said channel, means for generating gating pulses, means for applying said gating pulses to said gating circuit, said generating means including a ringing circuit generating gating pulses substantially in the form of a half cycle of sinusoidal oscillation and containing substantially only frequency components lower than the frequency components of signals passed by said channel.

4. In a radio receiver the provision, in an early stage thereof where the signal level is low, of a high frequency channel including an electrical gating circuit for gating low level signals in said channel, means for generating gating pulses, means for applying said gating pulses to said gating circuit, said generating means including a multivibrator having an inductance in its output circuit and a unidirectionally conducting device to damp oscillations set up in said inductance thereby to generate half cycles of substantially sinusoidal oscillation each time said inductance is caused to ring by said multivibrator, said generated pulses containing substantially only frequency components lower than the frequency components of signals passed by said channel.

5. In a radio receiver the provision, in an early stage thereof where the signal level is low, of a high frequency channel including an electrical gating circuit for gating low level signals in said channel, means for generating gating pulses, means for applying said gating pulses to said gating circuit, said generating means generating pulses containing substantially only frequency components lower than the frequency components of signals passed by said channel, said means for applying said pulses to said gating circuit including a low pass filter through which said gating pulses are fed to said gating circuit.

6. In a radio receiver the provision, in an early stage thereof where the signal level is low, of a high frequency channel including an electrical gating circuit for gating low level signals in said channel, said gating circuit comprising a pair of valves connected in push-pull having their cathodes connected to a common cathode impedance in the form of a further valve, means for applying said signals to be gated to said pair of valves in push-pull, means for generating gating pulses, said generating means feeding gating pulses to said valve forming said cathode impedance, said gating pulses containing substantially only frequency components lower than the frequency components of signals passed by said channel.

7. In a radio receiver according to claim 6, the provision of a low pass filter in the output electrode circuit of said valve forming said cathode impedance.

8. In a radio receiver according to claim 6, the provision of screening grids for said pair of valves and means for applying a differential bias to said screening grids.

9. In a radio receiver according to claim 6, the provision of a bleed resistance connected to the cathodes of said pair of valves to ensure that the impedances of said cathodes do not vary substantially during the gating periods.

10. In a radio receiver according to claim 6, the provision of a low pass filter arranged in the output circuit of said valve forming said cathode impedance and screening grids for said pair of valves, means for applying a differential bias to said grids and a bleed resistance connected to the cathodes of said pair of valves so as to ensure that the impedances of said cathodes do not vary substantially during the gating periods.

11. In radar apparatus including a radio receiver the provision, in an early stage thereof where the signal level is low, of a high frequency channel including an electrical gating circuit for gating low level radar signals in said channel, means for generating gating pulses, means for deriving from said generating means gating pulses containing substantially only frequency components lower than the frequency components of signals passed by said channel and means for feeding said pulses to said gating circuit.

References Cited in the file of this patent

UNITED STATES PATENTS

| | | |
|---|---|---|
| 2,401,807 | Wolff | June 11, 1946 |
| 2,586,956 | Keizer | Feb. 26, 1952 |
| 2,586,957 | Keizer | Feb. 26, 1952 |
| 2,594,535 | Bertram | Apr. 29, 1952 |
| 2,619,594 | Goldberg | Nov. 25, 1952 |
| 2,757,282 | Exner | July 31, 1956 |

FOREIGN PATENTS

| | | |
|---|---|---|
| 494,405 | Canada | July 14, 1953 |